March 14, 1967 — S. H. AULD — 3,308,656
ENGINE PRESSURE RATIO SYSTEM
Filed Aug. 21, 1963 — 2 Sheets-Sheet 1

INVENTOR.
SAMUEL H. AULD

United States Patent Office 3,308,656
Patented Mar. 14, 1967

3,308,656
ENGINE PRESSURE RATIO SYSTEM
Samuel H. Auld, Wichita, Kans., assignor to Lear Jet Corporation, Wichita, Kans., a corporation of Delaware
Filed Aug. 21, 1963, Ser. No. 303,486
4 Claims. (Cl. 73—115)

This invention relates to pressure ratio measuring means and, in a more specific aspect, to means for measuring and visually indicating the ratio of pressures in a fluid stream. In a more specific aspect the invention relates to a pressure ratio measuring system for determining the relation between two fluid pressures sensed by the system, and the system is particularly useful in connection with determining the ratio between the inlet and exhaust gas pressures in a jet engine, or the like.

Various pressure measuring means are known to the art. The prior art systems include mechanical or electromechanical means for measuring of various types of signals including pressure measuring means. Instruments are also known for measuring pressures and pressure ratios, including instruments for measuring the ratio between the inlet and exhaust gas pressures in a jet engine or the like. Typical prior art means include electromechanical computers which are mounted directly on the engine and which perform a division operation in determining the ratio of the inlet and exhaust pressures. Such ratios are important to the pilot of an aircraft or the like since the ratio is an indication of the thrust being developed by the engine during operation of the aircraft. The prior art devices, such as the electromechanical computer means mentioned are relatively complex and in use have proved to be relatively unreliable and in some instances are affected by heat generated by operation of the engine.

In accordance with the present invention new pressure measuring means are provided which overcome many disadvantages of the prior art devices. The pressure measuring means of the invention includes pressure sensing means having a portion positionable in a fluid stream, such as a jet engine or the like, and means are provided therewith which are operable to provide an electrical signal in response to the pressure of the fluid sensed. Means are electrically connected to the pressure sensing means for modulating and amplifying an electrical signal received therefrom and demodulator means are operatively connected thereto to receive and demodulate the signal. Measuring means are operatively connected to the demodulator means for receiving and measuring a signal therefrom, and the pressure ratio measuring means is constructed and adapted so that pressure of the fluid in the fluid stream causes an electrical signal to be supplied to the indicator means.

Accordingly, it is an object of the invention to provide new pressure ratio measuring means.

Another object of the invention is to provide new pressure ratio measuring means for measuring and indicating the ratio of fluid pressures in fluid streams.

A further object of the invention is to provide new pressure ratio measuring means for determining the relation between the inlet and exhaust fluid pressures in a jet engine or the like.

Another object of the invention is to provide new electronic pressure ratio measuring means for jet engines and the like wherein pressure sensing means are positionable in the inlet and exhaust of the jet engine with the electronic apparatus being positionable in the cabin or the like of the aircraft.

A still further object of the invention is to provide new pressure ratio measuring means which are relatively simple in comparison with many prior art devices and which is not subject to shock, vibration and temperature error.

A still further object of the invention is to provide new pressure ratio measuring means for jet engines or the like which is small in size and weight and wherein the electronics of the system is relatively simple and where standard transducers can be used for sensing pressures.

Another object of the invention is to provide new pressure ratio measuring means which are relatively inexpensive to construct and install and which have high thermal stability.

Various other objects, advantages and features of the invention will become apparent to those skilled in the art from the following discussion taken in connection with the accompanying drawings, in which.

The following is a discussion and description of preferred specific embodiments of the engine pressure ratio systems of the invention, such being made with reference to the drawings wherein the same numerals are used to indicate the same or similar parts and/or structure. It is to be understood that such discussion and description is not to unduly limit the scope of the invention.

Figure 1:
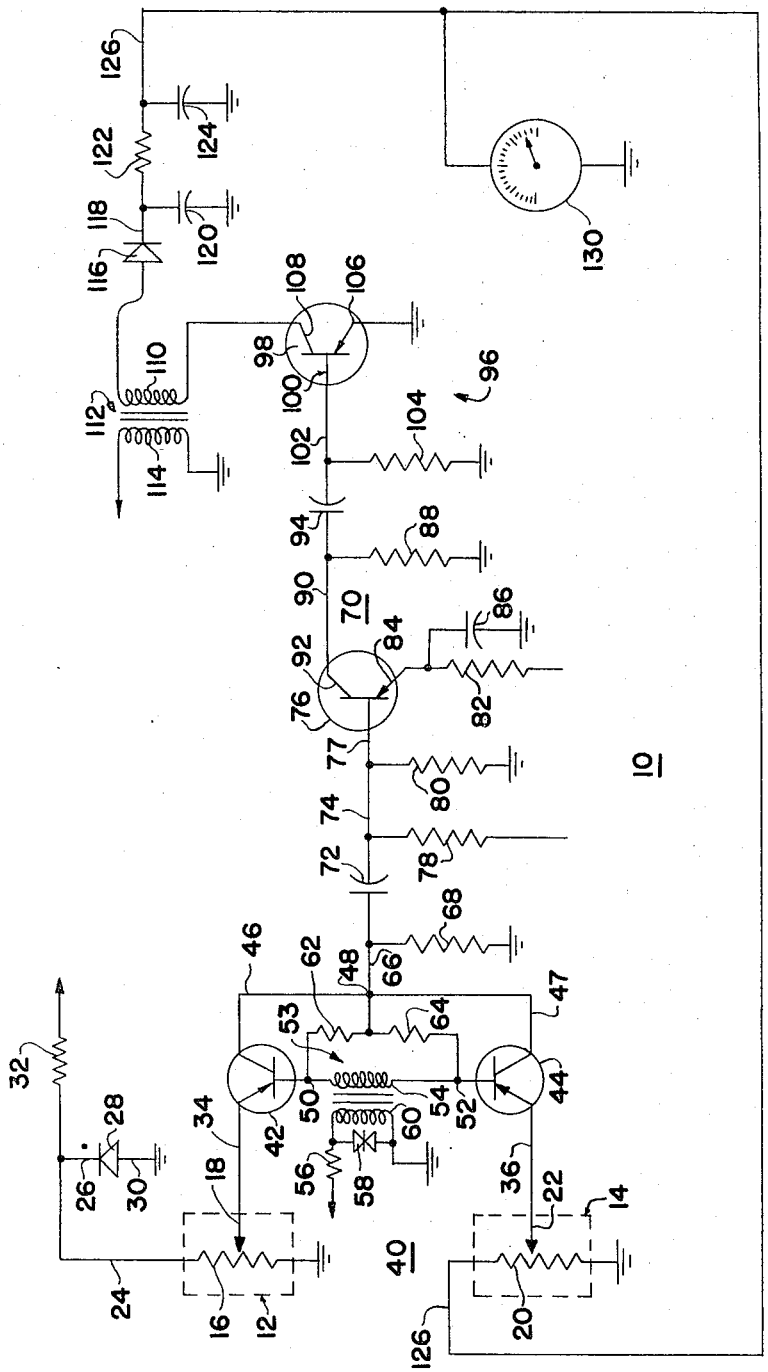
FIG. 1 is a schematic diagram illustrating a preferred specific embodiment of the pressure ratio measuring means of the invention.

Referring now to the drawings in detail, a schematic view of a preferred specific embodiment of the pressure ratio measuring means of the invention is shown generally at 10 in FIG. 1 and includes pressure transducers 12 and 14 which are preferably of a potentiometric type and can be of any suitable construction including those commercially available. The transducers 12 and 14 in operation sense a fluid pressure and provide an electrical signal in response to or in relation to the fluid pressure sensed. The transducer 12 includes a resistor 16 and a wiper arm 18 movable along the resistor and the wiper arm is operatively connectible to means to sense pressure at the inlet or outlet of a jet engine or the like or at other locations in a fluid to thereby cause movement of the wiper arm relative to the resistor. Likewise the transducer 14 has a resistor 20 and a wiper arm 22 and the transducers 12 and 14 can be of the same or similar construction.

One side of the resistor 16 is grounded and the other side thereof is operatively connectible to a source of excitation voltage, such as by the use of a conductor 24 which is operatively connected to the cathode 26 of a zener diode 28 which has the anode 30 thereof grounded. Conductor 24 is also connected to a resistor 32 which in turn is connected to a source of excitation voltage. Preferably, resistor 32 is connected to a 28 volt source and zener diode 28 operates to provide a fixed voltage to resistor 16, such as 6 volts D.C. The wiper arm 18 which moves in response to the pressure sensed by the transducer effectively divides the excitation voltage received by resistor 16 to result in the output of the transducer to the wiper arm 18 being related to the pressure of the fluid being sensed by the transducer. The transducer 14, which is excited in a manner explained more fully hereinafter, operates in the same or similar manner as the transducer 12 to provide a signal at the wiper arm 22 which is related to the fluid pressure being sensed.

Wiper arms 18 and 22 of transducers 12 and 14 are connected by conductors 34 and 36, respectively, to two inputs of a modulator which is shown generally at 40. The modulator 40 includes transistors 42 and 44 and the conductors 34 and 36 are conducted to the emitters of the transistors as illustrated. The collectors of the transistors 42 and 44 are connected by conductors 46 and 47 to a terminal 48 and the bases of the transistors 42 and 44 are connected to terminals 50 and 52 and to opposite ends of the secondary winding 54 of a transformer 53.

A suitable carrier or reference voltage is applied to a resistor 56 and to a double zener diode 58. The reference voltage can be a 115 volts and double zener diode in operation serves to generate a square wave voltage, dropping any voltage in excess of a specific voltage, such as 6 volts, which appears across the resistor 56. The double zener diode 58 is connected in parallel to the primary winding 60 of the transformer to thereby provide a square wave modulating voltage to the secondary 54 of the transformer 53. Transformer 53 can be a 1 to 1 transformer. Resistors 62 and 64 are connected to terminals 50 and 52, respectively, and the resistors are both connected to the terminal 48.

As explained hereinbefore, the double zener diode 58 functions to provide a square wave voltage. A square wave excitation to the transistors 42 and 44 is desirable in order to keep the noise output of the modulator at a minimum value. However, a sine wave excitation is also satisfactory but results in a greater noise component generated within the modulator.

A conductor 66 is connected in one end to the terminal 48 of the modulator and a resistor 68 is connected to the conductor 66 and to ground. The voltage appearing across the resistor 68 is the modulated error voltage which was originally fed into the modulator.

The modulated signal from the modulator 40 is preferably provided to an amplifier which is shown generally at 70. The modulator 40 output can be coupled to the amplifier 70 by a capacitor 72 which has one side thereof connected to the other end of the conductor 66. The other side of the capacitor 72 is connected to one end of a conductor 74 which is connected in the other end to the base 77 of a transistor 76. Resistors 78 and 80 are provided and each have one side connected to the conductor 74 and in operation they bias the base 77 of the transistor 76. The other side of resistor 78 is connected to a source of voltage, such as a 28 volt source, and the other side of resistor 80 is desirably grounded as shown. The emitter resistor for transistor 76 is shown at 82 and is connected to the emitter 84 of the transistor 76 and to a source of voltage, such as a 28 volt source. A capacitor 86 is desirably provided and has one side connected to ground and the other side is connected to emitter 84 and the capacitor 86 is the emitter by-pass capacitor. A resistor 88 is provided and is the collector load resistor and has one side connected to ground and the other side is connected to a conductor 90 which is connected to the collector 92 of the transistor 76. The other end of the conductor 90 is connected to one side of a capacitor 94 which is provided to couple the amplifier output to a demodulator shown generally at 96.

The demodulator 96 preferably includes a transistor 98 which has a base 100 electrically connected to one end of a conductor 102 which has the other end thereof connected to the other side of the capacitor 94 and the base resistor 104 is connected to conductor 102 and to ground and functions to maintain the base 100 of transistor 98 at substantially ground potential in the absence of a drive signal from the amplifier 70. The emitter 106 of the transistor 98 is preferably connected to ground as shown and the collector 108 is connected to the secondary winding 110 of a transformer 112 which has the primary 114 connected to a source of reference voltage, such as a 115 volt source. The other side of the winding 110 of transformer 112 is connected to the anode of a diode 116 which has the cathode side connected to a lead or conductor 118.

A capacitor 120 has one side thereof connected to the conductor 118 and the other side thereof is grounded and a resistor 122 is provided and is connected in one end to the other end of the conductor 118. The other end of the resistor 122 and one side of a capacitor 124 are connected to one end of a conductor 126. Capacitors 120 and 124 and resistor 122 form an output filter. The other end of conductor 126 is connected to one side of the resistor 20 of the transducer 14 to provide the output of the demodulator 96 to the resistor 20. Thus, the output of the demodulator is applied as excitation to the top of the resistor 20 of the transducer 14. The other side of resistor 20 is grounded.

The transistor 98 of the demodulator 96 functions in the manner of a switch which is closed for one-half of each cycle of reference frequency. The particular half cycle in which the transistor 98 is closed is a function of the phase of the output of the modulator 40, which in turn is a function of the polarity of the error signal existing between the wipers of the transducers 12 and 14. The polarity at the wiper of the transducer 14 is always equal to or more positive than the wiper 18 of the transducer 12. Therefore, the output phase of the modulator is always constant and transistor 98 of the demodulator 96 is always closed on a particular half cycle. This half cycle is selected as the half cycle which will cause current to flow through the diode 116 and into the output filter consisting of the capacitors 120 and 124 and the resistor 122.

Indicator means are preferably provided to record the ratio between the fluid pressures sensed by transducers 12 and 14. For this purpose a common voltmeter 130 is provided and has one side connected to conductor 126 between capacitor 124 and the transducer 14 and the other side of the voltmeter 130 is grounded.

Figure 2:
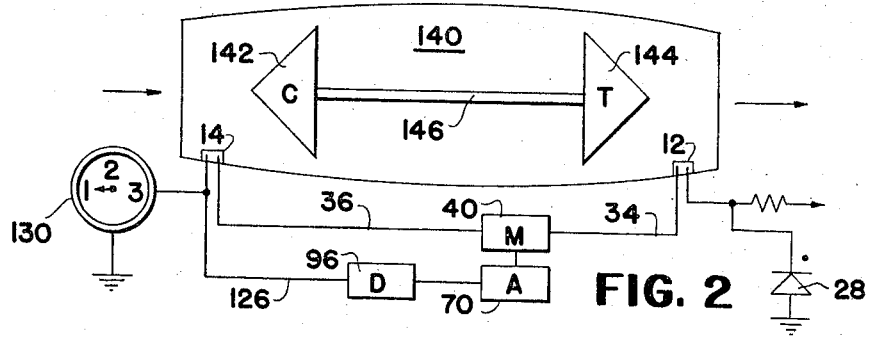
FIG. 2 is a diagrammatic view showing the system of FIG. 1 in connection with a jet engine or the like for measuring the pressure ratio between the inlet and exhaust portions of the engine.

FIG. 2 of the drawings diagrammatically illustrates the pressure ratio measuring means or circuit as shown in FIG. 1 associated with a jet engine to measure the ratio between the inlet and exhaust gas pressures of the jet engine or the like. The engine is shown generally at 140 and can be of any suitable type or construction. The engine 140 diagrammatically illustrated in FIG. 2 is a turbo-jet engine including a compressor 142 and a turbine 144 connected to the compressor by shaft 146 or other suitable means. Air flow through the engine is illustrated by the arrows at the ends of the engine in FIG. 2. The transducer 12 is mounted on the engine 140 at the exhaust thereof and transducer 14 is mounted at the inlet end portion of the engine 140 to sense exhaust gas pressures. The transducers 12 and 14 can be physically mounted on the engine as illustrated in FIG. 2 or, when remote sensing means are provided with common transducer constructions, the resistor portions of the transducers can be remotely mounted and the wiper arms operatively connected to pressure sensing means at the engine inlet and exhaust. The electronics portion of the system can be suitably mounted in the cabin of the aircraft and can be positioned within the housing of the voltmeter, if desired. By mounting the electronic portion of the system in the cabin, it is not subject to the extreme temperature changes encountered in the engine.

The system when mounted as illustrated in FIG. 2 will provide readings on the meter 130 which will indicate the ratio between the air inlet pressure at transducer 14 and the exhaust gas pressure at transducer 12. This ratio is known as the engine pressure ratio and such is an indication of the thrust being developed by the engine. When in operation the engine is developing no thrust, the ratio has a value of one and during normal operation the ratio typically rises to values of two and three, although the voltmeter can be scaled to indicate any pressure ratios anticipated during operation of a specific engine.

In operation of the engine pressure ratio measuring means of the invention, an excitation voltage is supplied to the transducer 12 from zener diode 28 and the diode 28 functions to maintain the applied voltage at a constant value, such as the 6-volt value previously mentioned.

The circuit shown generally at 10 in FIG. 1 is actually a closed loop. In operation, when the transducer 12 is in the center of its travel, then a voltage of three volts positive appears at the wiper arm 18. This signal voltage is applied to the modulator 40 and results in a substantial output to appear at the modulator output which is provided to the amplifier for amplification and subsequently to the demodulator for demodulation and is subsequently applied as excitation voltage to the transducer 14. The closed loop circuit functions so that any differential error between the wiper arms 18 and 22 is greatly amplified and applied as excitation to the transducer 14 in the direction to reduce the error between the two wiper arms. If the gain of the amplifier was infinite then the smallest possible error between the two wiper arms would create an infinitely large voltage to excite transducer 14 in the direction to reduce the error to a smaller value.

When in operation the engine is developing a pressure ratio of one and thus the wiper arms of the transducers 12 and 14 are in the same physical position. Due to the high gain of the amplifier 70 any error differential between the two wiper arms has an output appearing as excitation on transducer 14 causing the error to be reduced. When the input voltage or excitation voltage to transducer 12 is six volts, then the voltage appearing as excitation voltage to transducer 14, which causes the error differential between the wiper arms to be a minimum value, is six volts. The voltmeter 130 is calibrated so that an output of six volts from the demodulator causes the voltmeter to read or indicate an engine pressure ratio of one, such as illustrated in FIG. 2.

Figure 4:
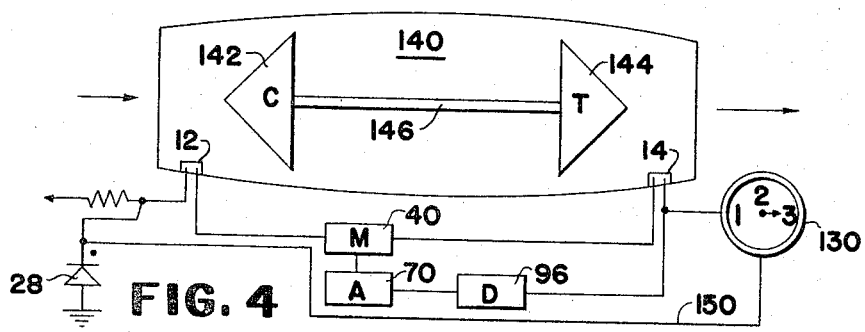
FIG. 4 is a diagrammatic view similar to FIG. 2 showing another preferred specific embodiment of the invention.
Figure 5:
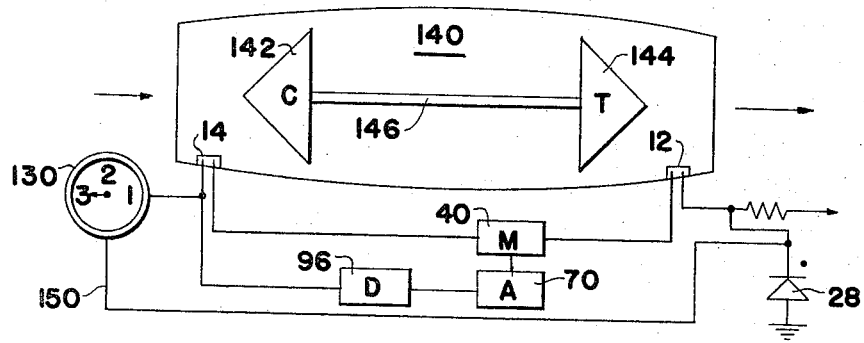
FIG. 5 is a diagrammatic view somewhat similar to FIG. 4 wherein the transducers are reversed to provide a different meter or indicator reading.

When the engine develops a pressure ratio of three, see FIGS. 4 and 5, the pressure at the exhaust of the engine 140 causes the wiper arm 18 of transducer 12 to take up a physical position on resistance 16, reflecting the fact that the pressure at transducer 12 is three times as great as the pressure at transducer 14. For the purpose of illustration, such position for wiper arm 18 at the 3:1 pressure ratio is at the top of resistance 16. In the exemplary system it thus would be impressed with the full reference six volts D.C. Correspondingly, the position of wiper arm 22 on resistance 20 would be only one-third up during the 3:1 ratio hereof, and thus receive only one-third of the voltage appearing across resistance 20. The 3:1 physical positioning of arms 18 and 22 in their respective pressure-sensitive transducer 12 and 14 relate directly to the intended purpose and resultant measurement of the invention system. The modulator 40, amplifier 70 and demodulator 96 operate so that a voltage is applied via lead 126 as excitation across resistance 20 of transducer 14 to cause the electrical error between the two wiper arms to be at a minimum. When transducer 12 is excited by the six volts at the 3:1 ratio the excitation voltage necessary to cause the electrical signal between the two wiper arms to be reduced to a low value, is nearly eighteen volts. Assuming a sufficient gain for the amplifier, the excitation voltage by lead 126 to transducer 14 reaches near to but not exactly the eighteen volts and the voltmeter 130 is calibrated so that eighteen volts causes same to indicate a ratio of three. It will now be evident to those skilled in the art that for pressure ratios that are intermediate between 3:1 and 1:1, as set forth, the physical positions of wiper arms 18 and 22 will correspond thereto, and the electrical feedback signal via lead 126 to "nearly" rebalance the modulator 40 will apply a voltage across resistance 20 at a magnitude having a ratio to that across resistance 16 equal to the physical ratio of arms 18 and 22. The modulator 40 does not reach null in the steady-state indications of the ratios by calibrated meter 130, since a residual signal remains that is amplified and subsequently rectified, as set forth, to provide the proper magnitude of feedback signal for the ratio readings.

Figure 3:
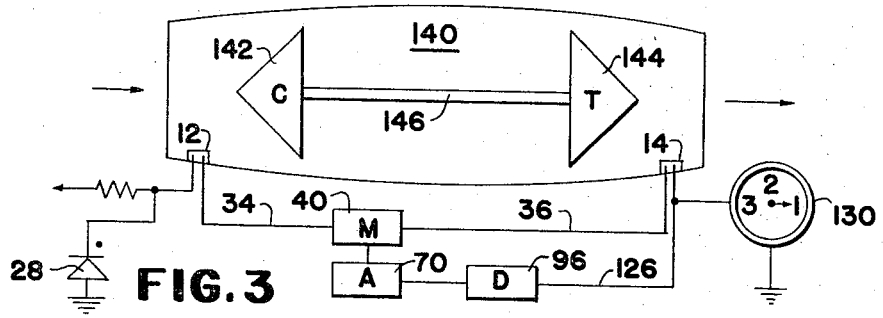
FIG. 3 is a diagrammatic view similar to FIG. 2 showing an embodiment of the invention wherein the transducers of the system of FIG. 2 are reversed so that the meter or indicator reads larger numbers as the pressure ratio is increased.

The system of FIGS. 1 and 2 when mounted as shown in FIG. 2 is such that the meter 130 will read a larger and larger voltage as the ratio between the inlet and exhaust gases becomes larger and the meter 130 is calibrated for this type of operation. FIG. 3 of the drawings illustrates the system of FIG. 1 wherein the transducers 12 and 14 are reversed so that the transducer 12 is located at the inlet end of the engine 140 and transducer 14 is located at the exhaust end of the engine. With this connection the meter 130 will read smaller and smaller values as the engine pressure ratio is increased and the meter 130 is shown calibrated for this type of operation.

Another preferred specific embodiment of the invention is illustrated in FIG. 4 of the drawings. This embodiment is the same or similar to that described hereinbefore in connection with FIGS. 1 and 3 except that the voltmeter 130 instead of being grounded is connected by a conductor 150 to the cathode of the zener diode 28. FIG. 4 provides a structure such that when the engine pressure ratio is one, the meter 130 has substantially zero volts impressed across it. This is advantageous in some instances, since the usable scale length on the meter is thus increased because the entire scale length of the meter can be used to read ratios ranging from one to three while the arrangements shown in FIGS. 1–3 are such that some voltage is impressed across the voltmeter even when an engine pressure ratio of one is being measured and thus has a shorter usable scale length. Since an engine pressure ratio system is never called upon to report ratios of less than one, the systems of FIG. 4 results in greater accuracy as a result of a larger usable scale available.

FIG. 5 illustrates a still further preferred specific embodiment of the invention which is the same as that described hereinbefore in connection with FIGS. 1 and 2 except the voltmeter 130 is connected to the cathode of diode 28 by conductor 150. In this embodiment, the full length of the voltmeter scale is utilized and larger pressure ratios result in a larger voltage being applied to the voltmeter.

In constructing the circuit of FIG. 1, the various values for the elements of the system can be varied within the skill of the art in order to accomplish the desired result. The following specific example of values for the various elements of the system is given by way of illustration and is not intended to unduly limit the scope of the invention.

Assuming a power supply of 28 volts as set forth hereinbefore, diode 28 can be a 1N753B diode, the resistor 32 can be approximately 470 ohms and the resistor 16 of the transducer 12 can have a value of about 1000 ohms. The transistors 42 and 44 can be of the 2N217 type and zener diode 58 can be a 1N429 diode. The resistor 56 can be approximately 1800 ohms and resistors 62 and 64 can be about 10,000 ohms each. Resistors 68 and 78 can be about 10,000 ohms and resistor 80 can be 100,000 ohms. The capacitor 72 can be about one microfarad. The transistor 76 can be a 2N1183 transistor, the emitter resistor 82 can be about 470 ohms and capacitor 86 can be about 10 microfarads. Resistors 88 and 104 can each be about 1000 ohms and capacitor 94 can be a 10 microfarad capacitor. The transistor 98 can be a 2N1183B transistor and diode 116 can be a 1N645 diode. The capacitors 120 and 124 can be 100 microfarad capacitors and resistor 122 can be about 470 ohms. The resistor 20 of transducer 14 will be of the same value as the transducer 12 and can be about 1000 ohms.

The engine pressure ratio systems of the invention provide systems which are less complicated than many prior art devices or systems and standard transducers are employed rather than specialized electromechanical computors or the like which are more subject to shock and vibration errors. In addition, great accuracy is provided with the systems of the invention because the accuracy of the overall system is essentially that of the transducers and the voltmeter, both of which can be accurately controlled. The electronic components of the system provide high gain, but do not have to be of high accuracy due to the closed loop design. The systems of the invention are relatively small in size and weight and the electronics portion of the systems can be packaged entirely within the indicating voltmeter housing to thereby provide systems which consist only of the two transistors and the panel mounted instrument to thereby result in a considerable savings in weight, complexity and cost over prior art systems. In addition, the use of standard transducers and a standard panel-mounted instrument such as the voltmeter, the cost of the overall system is substantially less than systems requiring mechanical or electromechanical computor systems. Also, since the electronics system does not require high accuracy, thermal drift within the electronics is not a problem and since the electronics can be mounted in the cabin of the aircraft or the like it is not subject to substantial temperature variations as are devices which must be mounted on the engine itself.

While the invention has been described in connection with preferred specific embodiments thereof and for use with jet engines or the like, it will be understood that such is intended to illustrate and not to limit the scope of the invention which is defined by the claims.

I claim:

1. A pressure ratio measuring device for determining the relation between the exhaust and inlet pressures of a jet engine or the like, comprising, in combination, a first pressure transducer of the potentiometric type having a wiper arm and a resistor with one side of said resistor being connectible to a source of an excitation voltage with the other side thereof being at a reference signal level, means to sense pressure at the inlet of the engine with the first said wiper arm being operatively connected thereto, means operable to regulate the level of the excitation voltage applied to said resistor, a modulator having two inputs and an output with one of said inputs being connected to said wiper arm of said first transducer, an amplifier having an input connected to said output of said modulator with said amplifier being operable to receive and amplify a signal therefrom, a demodulator having the input thereof electrically connected to the output of said amplifier to receive and demodulate a signal received therefrom, a second transducer of the potentiometric type having a wiper arm and a resistor with one side of said resistor being at said reference signal level and with the output of said demodulator being electrically connected to the other side of said resistor of said second transducer, said wiper arm of said second transducer being connected to the other input of said modulator, means to sense pressures at the exhaust of the engine with the second said wiper arm being operatively connected thereto, a meter electrically connected to said output of said demodulator, said device being constructed and adapted so that said wiper arms of said transducers are moved in response to inlet and exhaust pressures in the engine during operation of the engine to provide an electrical signal to said modulator inputs with the difference therebetween being amplified by said amplifier and demodulated by said demodulator to be imposed on said meter to provide a visible indication of the ratio of the pressures between said transducers.

2. A pressure ratio measuring device for determining the relation between the exhaust and the inlet pressures of a jet engine or the like, comprising, in combination, a first pressure transducer of the potentiometric type having a wiper arm and a resistor with one side of said resistor being connectible to a source of an excitation voltage with the other side thereof being at a reference signal level, means to sense pressure at the inlet of the engine with the first said wiper arm being operatively connected thereto and being movable along said resistor in response to fluid pressures in the engine or the like, means operable to regulate the level of the excitation voltage applied to said resistor, a modulator having two inputs and an output with one of said inputs being connected to said wiper arm of said first transducer, an amplifier having an input connected to said output of said modulator and being operable to receive and amplify a signal therefrom, a demodulator having the input thereof electrically connected to the output of said amplifier and being operable to receive and demodulate a signal received from said amplifier, a second transducer of the potentiometric type having a wiper arm and a resistor with one side of said resistor being at said reference signal level, a filter at the output of said demodulator to provide a unidirectional signal in accordance with the demodulator signal output, said unidirectional signal being electrically connected to the other side of said resistor of said second transducer, said wiper arm of said second transducer being connected to the other input of said demodulator, means to sense fluid pressure at the outlet of the engine with the second said wiper arm being operatively connected thereto, a meter electrically connected to said output of said filter, said device being constructed and adapted so that said wiper arms of said transducers are moved in response to inlet and exhaust pressures in the engine during operation of the engine to provide an electrical signal to said modulator inputs with the difference therebetween being amplified by said amplifier and demodulated by said demodulator and imposed on said meter to provide a visible indication of the ratio of the pressures between said transducers.

3. A pressure ratio measuring device for determining the relation between the exhaust and inlet pressures of a jet engine or the like comprising, in combination, a first pressure transducer of a potentiometric type having a wiper arm and a resistor with one side of said resistor being at a reference signal level and with the other side thereof being connectible to a source of an excitation voltage, means to sense pressure at the exhaust of the engine with the first said wiper arm being operatively connected thereto, a zener diode operatively connected to said one side of said resistor and being operable to regulate excitation voltage applied to said resistor, a modulator having two inputs and an output with one of said inputs being connected to said wiper arm of said first transducer, an amplifier having an input connected to said output of said modulator with said amplifier being operable to receive and amplify a signal therefrom, a demodulator having the input thereof electrically connected to the output of said amplifier to receive and demodulate a signal received therefrom, a second transducer of the potentiometric type having a wiper arm and a resistor with one side of said resistor being at said reference signal level and with the output of said demodulator being electrically connected to the other side of said resistor of said second transducer, said wiper arm of said second transducer being operatively connected to the other input of said modulator, means to sense pressures at the inlet of said engine with the second said wiper arm being operatively connected thereto, a voltmeter electrically connected to said output of said demodulator, said device being constructed and adapted so that said wiper arms of said transducers are moved in response to inlet and exhaust pressures in the engine during operation of the engine to provide an electrical signal to said modulator inputs with the difference therebetween being amplified by said amplifier and demodulated by said demodulator to be imposed on said voltmeter to provide a visible indication of the ratio of the pressures between said transducers.

4. A pressure ratio measuring device for determining the relation between the exhaust and inlet pressures of the jet engine or the like comprising, in combination, a first pressure transducer of a potentiometric type having a wiper arm and a resistor with one side of said resistor being grounded and with the other side thereof being connectible to a source of an excitation voltage, means to sense fluid pressure at the exhaust of the engine with the first said wiper arm being operatively connected thereto, a zener diode having the cathode thereof operatively connected to said one side of said resistor and being operable to regulate excitation voltage to said resistor, a modulator having two inputs and an output with one of said inputs being connected to said wiper arm of said first transducer, an amplifier having an input connected to said output of said modulator with said amplifier being operable to receive and amplify a signal therefrom, a demodulator having the input thereof electrically connected to the output of said amplifier to receive and demodulate a signal received therefrom, a second pressure transducer of the potentiometric type having a wiper arm and a resistor with one side of said resistor being grounded and with the output of said demodulator being electrically connected to the other side of said resistor of said second transducer, said wiper arm of said second transducer being operatively connected to the other input of said modulator, means to sense pressures at the inlet of said engine, with the second said wiper arm being operatively connected thereto, a voltmeter electrically connected to said output of said demodulator and to said cathode of said zener diode, said device being constructed and adapted so that said wiper arms of said transducers are moved by fluid pressures in the engine during operation of the engine to provide an electrical signal to said modulator for modulation therein and with the resulting signal being amplified by said amplifier and demodulated by said demodulator to be imposed on said voltmeter to provide a visible indication of the ratio between inlet and exhaust pressures of the engine.

References Cited by the Examiner
UNITED STATES PATENTS

| | | | |
|---|---|---|---|
| 2,675,510 | 4/1954 | Belcher | 323—64 |
| 2,759,354 | 8/1956 | Cherry et al. | 73—27 |
| 3,045,492 | 7/1962 | Kutzler | 73—407 |

RICHARD C. QUEISSER, *Primary Examiner.*

J. W. MYRACLE, *Assistant Examiner.*